United States Patent Office 2,899,448
Patented Aug. 11, 1959

2,899,448

3β,11β,17α,21 - TETRAHYDROXY - 5 - PREGNEN-20-ONE,3,21-DIESTERS INTERMEDIATES AND PROCESS FOR THE PRODUCTION THEREOF

Philip F. Beal and John A. Hogg, Kalamazoo, Mich., assignors to The Upjohn Company, Kalamazoo, Mich., a corporation of Michigan No Drawing. Application April 16, 1958
Serial No. 728,766

15 Claims. (Cl. 260—397.45)

The present invention relates to novel steroids and is more particularly concerned with 3β,11β,17α,21-tetrahydroxy-5-pregnen-20-one and the 3β,21-diacylate thereof, to novel intermediates in the production thereof and to the processes for the production of the novel compounds and novel intermediates.

The novel compounds of the present invention and the process of the production thereof can be represented by the following sequence of formulae:

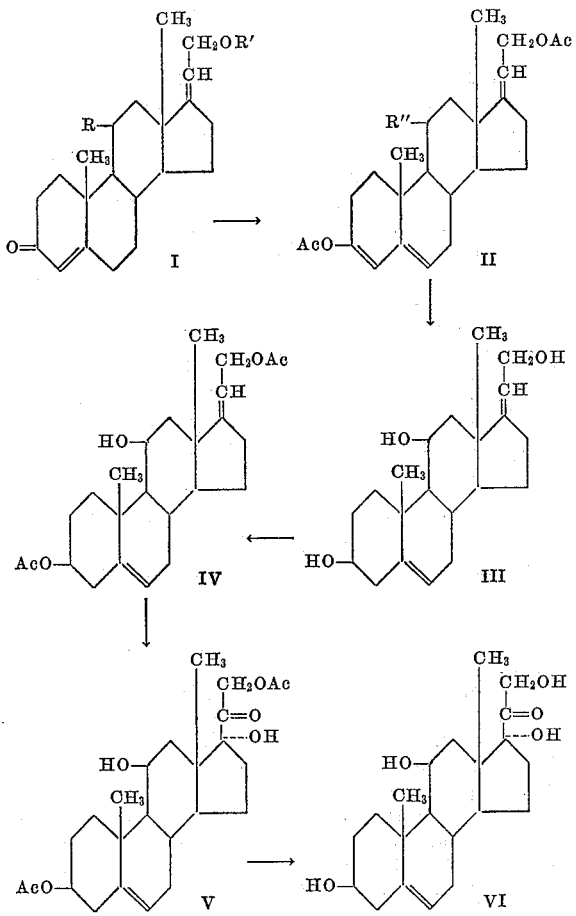

wherein Ac is an acyl radical of an organic carboxylic acid, preferably of a hydrocarbon carboxylic acid containing from one to twelve carbon atoms, inclusive, R is a member of the group consisting of keto and β-hydroxy, R' is selected from the group consisting of hydrogen and acyl radicals of the formula Ac, defined as above and R" is a member of the group consisting of keto and β-acyloxy wherein the acyl radical is defined as above. These compounds are useful as intermediates in the production of adrenocortically active hormones.

The starting material for the process of the present invention is 11-oxygenated 21-hydroxy-4,17(20)-pregnadien-3-one (I), or a 21-ester thereof, wherein the 11-oxygen substituent is keto or β-hydroxy. Starting with 11β,21-dihydroxy-4,17(20)-pregnadien-3-one or the 21-acylate thereof, for example, the process of the instant invention comprises: treating 11β,21-dihydroxy-4,17(20)-pregnadien-3-one (I) or the 21-acylate thereof with an acylating agent, for example an anhydride, a chloride or bromide of an organic carboxylic acid, preferably a hydrocarbon carboxylic acid containing from one to twelve carbon atoms inclusive, in the presence of an acid catalyst such as paratoluenesulfonic acid, sulfuric acid, perchloric acid, and the like, or an isopropenyl acylate wherein the acyl group is of a hydrocarbon carboxylic acid as defined above, to obtain 3,11β,21-triacyloxy-3,5,17(20)-pregnatriene (II); reducing the thus obtained enol acylate (II) with an alkali metal borohydride such as sodium, potassium or lithium borohydride to obtain 11β,21-diacyloxy-5,17(20)-pregnadien-3β-ol, reacting the thus obtained 11β,21-diacyloxy-5,17(20)-pregnadien-3β-ol with lithium aluminum hydride to produce 5,17(20)-pregnadiene-3β,11β,21-triol (III), esterifying the latter compound (III) with an acylating agent selected from the group consisting of anhydrides and halides of organic carboxylic acids, preferably, hydrocarbon carboxylic acids containing from one to twelve carbon atoms, inclusive, thus producing the corresponding 3β,21-diacyloxy-11β-hydroxy-5,17(20)-pregnadiene (IV); and treating the thus obtained 3β,21-diacyloxy-11β-hydroxy-5,17(20)-pregnadiene (IV) with osmium tetroxide to produce the 3β,21-diacyloxy-11β,17α,20-trihydroxy-5-pregnene 17,20-osmate ester, which is then oxidized as with perchloric acid, salts thereof, potassium chlorate, hydrogen peroxide, dialkyl peroxides, amine oxide peroxides, organic peracids such as peracetic or perbenzoic acid, and the like, in a solvent such as ether or an alcohol, e.g., tertiary butyl alcohol or diethyl ether; to produce 3β,11β,17α,21-tetrahydroxy-5-pregnen-20-one 3,21-diacylate (V). Hydrolysis of the 3β,11β,17α,21-tetrahydroxy-5-pregnen-20-one 3,21-diacylate with a base such as an alkali metal carbonate or hydroxide in aqueous alkanol solution preferably in the absence of oxygen, e.g. under nitrogen and at room temperature or lower is productive of 3β,11β,17α,21-tetrahydroxy-5-pregnen-20-one (VI).

Alternatively, 21-hydroxy-4,17(20)-pregnadiene-11,20-dione can be used as the starting material. Following the same process given above, treating 21-hydroxy-4,17(20)-pregnadiene-11,20-dione (I) or the 21-acylate thereof, with an acylating agent, for example an anhydride, a chloride, or bromide of an organic carboxylic acid, preferably a hydrocarbon carboxylic acid containing from one to twelve carbon atoms inclusive, in the presence of an acid catalyst such as paratoluene-sulfonic acid, sulfuric acid, perchloric acid, and the like, or an isopropenyl acylate wherein the acyl group is of a hydrocarbon carboxylic acid as defined above, to obtain 3,21-diacyloxy-3,5,17(20)-pregnatrien-11-one (II); reducing the thus obtained enol acylate (II) with an alkali metal borohydride such as sodium, potassium, or lithium borohydride to obtain 21-acyloxy-5,17(20)-pregnadiene-3β,11β-diol, and reacting the thus obtained 21-acyloxy-5,17(20)-pregnadiene-3β,11β-diol with lithium aluminum hydride is productive of 5,17(20)-pregnadiene-3β,11β,21-triol (III) which is identical with compound III above.

The novel compounds of the present invention are useful as intermediates in the production of potent adrenocortically active steroids. For example, treating 3β,11β,17α,21-tetrahydroxy-5-pregnen-20-one (VI) or its 3,21-diacylate (V) with a peracid such as performic, peracetic or perbenzoic acid is productive of 3β,11β,17α,21-tetrahydroxy-5α,6α-oxido-pregnan-20-one or its 3,21-diacylate, respectively, treating the thus obtained 5α,6α-oxidosteroid with hydrogen fluoride or other fluorinating agent gives the corresponding 3β,5α,11β,17α, 21-pentahydroxy-6β-fluoropregnan-20-one or its 3,21-diacylate, respectively. If the diacylate is used, hydrolyzing the said 3β,5α,11β,17α,21-pentahydroxy-6β-fluoropregnan-20-one 3,21-diacylate under acid conditions, for example with boron trifluoride, gives 3β,5α, 11β,17α,21-pentahydroxy-6β-fluoropregnan-20-one, oxidizing the latter compound by the known Oppenauer process to obtain 5α,11β,17α,21-tetrahydroxy-6β-fluoropregnane-3,20-dione and, finally, treating the thus obtained 5α,11β,17α,21-tetrahydroxy-6β-fluoropregnane-3, 20-dione with a mineral acid such as hydrochloric acid is productive of 11β,17α,21-trihydroxy-6α-fluoro-4-pregnene-3-20-dione (6α-fluorohydrocortisone). 6α-fluorohydrocortisone exhibits approximately 9.3 times the glucocorticoid activity of hydrocortisone and approximately 2.4 times the anti-inflammatory activity of hydrocortisone, with low concomitant mineralocorticoid activity.

In accordance with the present invention there are provided 3β,11β,17α,21-tetrahydroxy-5-pregnen-20-one and the 3,21-diacylates thereof, wherein the acyl group is of a hydrocarbon carboxylic acid containing from one to twelve carbon atoms, inclusive, and intermediates for the production thereof, such as 3,21-diacyloxy-3,5, 17(20)-pregnatrien-11-one and 3,11β,21-triacyloxy-3,5, 17(20)-pregnatriene, 3β,11β,21-trihydroxy-5,17(20)-pregnadiene and 3β,11β,21-trihydroxy-5,17(20)-pregnadiene 3,20-diacylate. There are also provided processes for the production of 3β,11β,17α,21-tetrahydroxy-5-pregnen-20-one and the 3,21-diacylates thereof, and intermediates such as 3,21-diacyloxy-3,5,17(20)-pregatrien-11-one and 3-11β,21-triacyloxy-3,5,17(20)-pregnatriene, 3β,11β,21-trihydroxy-5,17(20)-pregnadiene and 3β,11β, 21-trihydroxy-5,17(20)-pregnadiene 3,20-diacylate. There are particularly provided 3β,11β,17α,21-tetrahydroxy-5-pregnen-20-one and the 3,21-diacylates thereof, and methods for the production thereof.

In carrying out the process of the present invention an 11-oxygenated-21-hydroxy-4,17(20)-pregnadien-3-one, or a 21-acylate thereof, wherein the 11-oxygen substituent is keto or β-hydroxy, is treated with an acylating agent in the presence of an acid catalyst to obtain the corresponding 3,11β,21-triacyloxy-3,5,17(20)-pregnatriene or 3,21-diacyloxy-3,5,17(20)-pregnatrien-11-one. The acylating agent can be an anhydride, a chloride or bromide of an organic carboxylic acid, preferably a hydrocarbon carboxylic acid containing from one to twelve carbon atoms inclusive, or an isopropenyl acylate wherein the acyl group is of a hydrocarbon carboxylic acid as defined above. Representative acylating agents are the anhydrides, chlorides or bromides, or isopropenyl acylates, of acetic, propionic, butyric, valeric, hexanoic, lauric, trimethylacetic, isobutyric, isovaleric, tertiary butylacetic, β-cyclopentylpropionic, cyclohexane carboxylic, cyclohexylacetic, benzoic, phenylacetic, β-phenylpropionic, ortho-, meta-, or para-toluic, succinic, adipic, acrylic, crotonic, undecylenic, propiolic, cinnamic, maleic, citraconic, lactic, mandelic, trifluoroacetic, chloroacetic, and furoic acids, and the like. Representative acid catalysts are perchloric acid, sulfuric acid, paratoluenesulfonic acid, benzene sulfonic acid, alpha- or beta-naphthalene-sulfonic acid, and the like. A large excess of acylating agent, five to twenty moles or more, is usually employed. If the acylating agent is solid, a solvent, such as the corresponding acid, dioxane, or other suitable solvent can be employed to obtain a liquid reaction mixture. Usually the acylating agent serves as solvent. The reaction is usually carried out in a temperature range from about ninety to about 150 degrees centigrade, conveniently at the boiling temperature of the acylating agent or solvent, but higher and lower temperatures are operative. At the above temperature range, about 0.01 to 0.05 mole of catalyst is sufficient, and the time of reaction is usually from two to eight hours. When isopropenyl acylate is used, the acetone formed is removed by distillation during the reaction period. The acylation reaction can also be carried out at room temperature or below, and in a period of two to eight hours, by using about one mole of catalyst. The product can be isolated by removing the solvents by evaporation under diminished pressure and washing the product with water to remove the catalyst. Alternatively, excess acylating agent can be destroyed by addition of water or an alkanol and the product can then be isolated by precipitation with a large quantity of water.

During the preparation of the 3-enol acylate, when the starting material contains a carbonyl group at the 11-position, formation of an enol acylate at the 11-position may occur. This does not matter as both the 11-ketone and the enol acylate thereof gave the same product in the reduction step following.

The thus obtained 11-oxygenated 3,21-diacyloxy-3,5, 17(20)-pregnatriene, wherein the 11-substituent is keto or β-acyloxy, is treated with a reducing agent such as lithium aluminum hydride or sodium borohydride to obtain 5,17(20)-pregnadiene-3β,11β,20-triol, or the 21-acylate thereof when sodium borohydride is employed. The reduction is carried out in a suitable solvent such as ether, benzene, pyridine, N-ethylmorpholine and the like if lithium aluminum hydride is used, or in dioxane, methanol, ethanol, isopropanol, tertiary butanol and the like if sodium borohydride is used. An excess of the reducing agent is employed, usually from three to six moles. The reduction can be carried out at a temperature of from zero to sixty degrees centigrade, and the reaction time is usually from three to sixteen hours. Excess reducing agent is destroyed by careful addition of ethyl acetate, for lithium aluminum hydride, or acetic acid, for sodium borohydride. The product can be isolated by adding water to the reaction mixture and extracting the product with an organic solvent such as methylene chloride, benzene, ether, and the like. In the preferred process of the present invention the 11-oxygenated 3,21-diacyloxy-3,5,17(20)-pregnatriene is first treated with sodium borohydride for ten to twenty hours at zero to thirty degrees centigrade, then with lithium aluminum hydride for two to five hours at twenty to thirty degrees centigrade, to give 5,17(20)-pregnadiene-3β,11β,21-triol.

The thus obtained 5,17(20)-pregnadiene-3β,11β,21-triol, or the 21-acylate thereof, is treated with an acylating agent such as the anhydride, chloride, or bromide of an organic carboxylic acid, preferably a hydrocarbon carboxylic acid containing from one to twelve carbon atoms, inclusive, to obtain the corresponding 5,17(20)-pregnadiene-3β,11β,21-triol 3,21-diacylate. Representative acylating agents are the anhydrides, chlorides or bromides of acetic, propionic, butyric, valeric, hexanoic, lauric, trimethylacetic, isobutyric, isovaleric, tertiary butylacetic, β-cyclopentylpropionic, ortho-, meta-, or para-toluic, succinic, adipic, lactic, mandelic, trifluoroacetic, chloroacetic, furoic and the like acids. Usually, a large excess, from five to twenty moles or more, of the acylating agent is used, which also serves as a solvent. If the acylating agent is a solid, suitable solvents such as dioxane, benzene, toluene, and the like may be added to provide a liquid reaction mixture. The reaction can be carried out at from sixty to 150 degrees centigrade, conveniently at the boiling point of the solvent. The time of reaction is usually from two to eight hours. Alternatively, the steroid and the acylating agent can be dissolved in an amine such as pyridine, collidine, N-ethyl-morpholine and the like and allowed to stand at zero to thirty degrees centigrade. The time of reaction is usually from four to sixteen hours. The product can be isolated by evaporation of the solvents under diminished pressure or by decomposing the excess acylating agent with water or an alkanol and precipitating the product with addition of water.

If a 5,17(20)-pregnadiene-3β,11β,21-triol. 21-acylate is used as starting material in the above step, a mixed ester in which the 3 and 21-acyl groups are different can be obtained if desired.

The oxidative hydroxylation of a 5,17(20)-pregnadiene-3β,11β,21-triol 3,21-diacylate to produce a 3β,11β,17α,21-tetrahydroxy-5-pregnen-20-one 3,21-diacylate is carried out by reaction with osmium tetroxide and an oxidizing agent such as hydrogen peroxide, peracids, alkyl peroxides, amine oxide peroxides, phenyl iodoso acetate and the like. A preferred procedure involves the reaction of a 5,17(20)-pregnadiene-3β,11β,21-triol 3,21-diacylate with osmium tetroxide and an oxidizing agent, preferably N-methylmorpholine oxide peroxide, in an organic solvent. Tertiary butyl alcohol is the preferred solvent but other solvents such as methanol, ethanol, acetone, dioxane and the like are operative. The reaction can be conducted either in the light or in the dark and usually at room temperature although temperatures of ten degrees centigrade to the boiling point of the mixture are operative. The time required for the reaction is not critical and can be varied between about one and 72 hours, the length of time being dependent on the temperature and the amount of osmium tetroxide and oxidizing agent employed.

3β,11β,17α,21-tetrahydroxy - 5 - pregnen-20-one can be obtained from 3β,11β,17α,21-tetrahydroxy-5-pregnen-20-one 3,21-diacylate by hydrolysis with a dilute alkali, such as sodium or potassium hydroxide, sodium or potassium carbonate, and the like. A preferred procedure is to employ at least two molar equivalents of an alkali metal hydroxide in a substantially oxygen-free solution of a mixture of a lower alkanol and water. The hydrolysis reaction is carried out at a temperature between ten and thirty degrees centigrade while protecting the mixture from atmospheric oxygen. After the hydrolysis is complete the reaction mixture is neutralized with an acid, for example acetic acid, and the hydrolyzed product recovered from the mixture by evaporation and crystallization, extraction with methylene chloride, or the like.

The following preparations and examples are illustrative of the products and process of the present invention and are not to be construed as limiting.

EXAMPLE 1

*3,21-dihydroxy-3,5,17(20)-pregnatrien-11-one 3,21-diacetate*

A reaction mixture consisting of five grams of 21-acetoxy-4,17(20)-pregnadiene-3,11-dione (prepared according to U.S. Patent 2,735,856), fifteen milliliters of isopropenyl acetate and 0.02 milliliter of concentrated sulfuric acid was refluxed rapidly for one hour during which 7.5 milliliters of distillate was removed by a takeoff, then heating was continued one more hour under total reflux. To the reaction mixture was added 0.1 gram of sodium acetate and the solvents were removed under diminished pressure. The thus obtained residue was chromatographed over 400 grams of Florisil (synthetic magnesium silicate) and on elution with six and eight percent acetone in Skellysolve B hexanes gave 4.60 grams of 3,21-diacetoxy-3,5,17(20)-pregnadien-11-one having a melting point of 90 to 97 degrees centigrade and an infrared absorption consistent with the structure.

EXAMPLE 2

*3,21-dihydroxy-3,5,17(20)-pregnatrien-11-one 3,21-dipropionate*

A solution is prepared containing in 100 milliliters of toluene five grams of 21-hydroxy-4,17(20)-pregnadiene-3,11-dione 21-propionate, 25 milliliters of propionic anhydride, and 100 milligrams of para-toluenesulfonic acid. This solution is heated at reflux in a nitrogen atmosphere for a period of four and one half hours. Thereafter, the solvent is removed in vacuo, giving a residue consisting of crude 3,21-dihydroxy-3,5,17(20)-pregnatrien-11-one 3,21-dipropionate, sufficiently pure for use in the subsequent reduction step.

In the same manner given above:

(1) Treating 21-hydroxy - 4,17(20) - pregnadien-3,11-dione 21-butyrate with butyric anhydride in the presence of para-toluenesulfonic acid is productive of 3,21-dihydroxy-3,5,17(20)-pregnatrien-11-one 3,21-dibutyrate.

(2) Treating 21 - hydroxy-4,17(20)-pregnadien-3,11-dione 21-benzoate with benzoyl chloride in the presence of para-toluenesulfonic acid is productive of 3,21-dihydroxy-3,5,17(20)-pregnatrien-11-one 3,21-dibenzoate.

(3) Treating 21 - hydroxy - 4,17(20)-pregnadiene-3,11-dione 21-benzoate with acetic anhydride in the presence of paratoluenesulfonic acid is productive of 3,21-dihydroxy-3,5,17(20) - pregnatrien-11-one 3-acetate 21-benzoate.

In the same manner shown in Examples 1 and 2, other 3,21-dihydroxy-3,5,17(20)-pregnatrien - 11 - one 3,21-diacylates are obtained by treating 21-hydroxy-4,17(20)-pregnadiene-3,11-dione or the 21-acylate, wherein the acyl group is of a hydrocarbon carboxylic acid containing from one to twelve carbon atoms, inclusive, under reflux conditions with an anhydride, a chloride or bromide of an organic carboxylic acid, preferably a hydrocarbon carboxylic acid containing from one to twelve carbon atoms, inclusive, or an isopropenyl acylate wherein the acyl group is of a hydrocarbon carboxylic acid containing from one to twelve carbon atoms, inclusive, in the presence of an acid catalyst, such as toluenesulfonic acid, sulfuric acid, or gaseous hydrochloric acid, to give the corresponding 3,21-dihydroxy - 3,5,17(20)-pregnatrien-11-one 3,21-diacylate.

EXAMPLE 3

*3,11β,21-trihydroxy-3,5,17(20)-pregnatriene 3,11β,21-triacetate*

A reaction mixture consisting of five grams of 11β-hydroxy 21-acetoxy-4,17(20)-pregnadien - 3 - one (U.S. Patent 2,774,776) fifteen milliliters of isopropenyl acetate and 0.02 milliliter of concentrated sulfuric acid is refluxed rapidly for one hour during which 7.5 milliliters of distillate is removed by a takeoff, then heating is continued one more hour under total reflux. To the reaction mixture is added 0.1 gram of sodium acetate and the solvent is removed under diminished pressure, leaving a residue of crude 3,11β,21-trihydroxy-3,5,17(20)-pregnatriene 3,11β,17-triacetate.

EXAMPLE 4

*3,11β,21-trihydroxy-3,5,17(20)-pregnatriene 3,11β,21-tripropionate*

A solution is prepared containing in 100 milliliters of toluene five grams of 11β,21-dihydroxy-4,17(20)-pregnadien-3-one 21-propionate, 25 milliliters of propionic anhydride, and 100 milligrams of paratoluenesulfonic acid. This solution is heated at reflux in a nitrogen atmosphere for a period of four and one half hours. Thereafter the solvent is removed in vacuo, giving a residue consisting of crude 3,11β,21-trihydroxy-3,5,17-(20)-pregnatriene 3,11β,21-tripropionate.

In the same manner given above:

(1) Treating 11β,21 - dihydroxy-4,17(20)-pregnadien-3-one 21-butyrate with butyric anhydride in the presence of paratoluenesulfonic acid is productive of 3,11β,21-trihydroxy-3,5,17(20)-pregnatriene 3,11β,21-tributyrate.

(2) Treating 11β,21-dihydroxy-4,17(20)-pregnadien-3-one 21-benzoate with benzoyl chloride in the presence of paratoluenesulfonic acid is productive of 3,11β-21-trihydroxy 3,5,17(20)-pregnatriene 3,11β,21-tribenzoate.

(3) Treating 11β,21 - dihydroxy-4,17(20)-pregnadien-3-one 21-benzoate with acetic anhydride in the presence of paratoluenesulfonic acid is productive of 3,11β,21-trihydroxy-3,5,17(20)-pregnatriene 3,11β-diacetate 21-benzoate.

In the same manner shown in Examples 3 and 4, other 3,11β,21-trihydroxy-3,5,17(20)-pregnatriene 3-11β,21-triacylates are obtained by reacting 11β,21-dihydroxy 4,17-(20)-pregnatrien-3-one or the 21-acylate, wherein the acyl group is of a hydrocarbon carboxylic acid containing from one to twelve carbon atoms, inclusive, under reflux conditions with an anhydride, a chloride or bromide of an organic carboxylic acid, preferably a hydrocarbon carboxylic acid containing from one to twelve carbon atoms, inclusive, or an isopropenyl acylate wherein the acyl group is of a hydrocarbon carboxylic acid containing from one to twelve carbon atoms, inclusive, in the presence of an acid catalyst, such as toluenesulfonic acid, sulfuric acid, or gaseous hydrochloric acid, to give the corresponding 3,11β,21-trihydroxy-3,5,17(20)-pregnatriene 3,11β,21-triacylate.

EXAMPLE 5

5,17(20)-pregnadiene-3β,11β,21-triol

A solution in 500 milliliters of isopropyl alcohol of 16.9 grams of 3,21-dihydroxy-3,5,17(20)-pregnatrien-11-one 3,21-diacetate which had been isolated by chromatography over synthetic magnesium silicate was cooled in an ice bath and three grams of sodium borohydride was added. The reaction mixture was allowed to stir for seventeen hours, during which time the cooling bath warmed to room temperature, then the excess borohydride was decomposed by dropwise addition of acetic acid. The acetic acid was neutralized by adding saturated aqueous sodium bicarbonate solution to the reaction mixture, and the isopropyl alcohol was removed by evaporation in vacuo. The residue was partitioned between methylene chloride and water, and the aqueous layer was again extracted with methylene chloride. The methylene chloride solutions were combined and evaporated to dryness in vacuo, then 100 milliliters of benzene was added to the residue and removed by distillation to insure dryness. The last traces of benzene were removed in vacuo. The thus obtained residue was dissolved in 100 milliliters of N-ethylmorpholine and this solution was added to a solution of three grams of lithium aluminum hydride in 400 milliliters of absolute ether. The reaction mixture was allowed to stand for three hours, then the excess lithium aluminum hydride was destroyed by the addition of 25 milliliters of ethyl acetate followed by 25 milliliters of water. The resulting mixture was filtered and the filtrate was concentrated under reduced pressure leaving a partially crystalline residue which was triturated with 200 milliliters of boiling acetone and filtered giving on the filter five grams of 5,17(20)-pregnadiene-3β,11β,21-triol having a melting point of 210 to 235 degrees centigrade. The acetone filtrate was concentrated to give two more crops of 5,17(20)-pregnadiene-3β,11β,21-triol; 2.6 grams having a melting point of 200 to 210 degrees centigrade and 6.4 grams having a melting point of 184 to 204 degrees centigrade.

In the same manner given above, treating other 3,21-diacylates of 3,21-dihydroxy-3,5,17(20)-pregnatrien-11-one wherein the acyl group is of an organic carboxylic acid, preferably a hydrocarbon carboxylic acid containing from one to twelve carbon atoms, inclusive, with sodium borohydride and then lithium aluminum hydride is productive of 5,17(20)-pregnadiene-3β,11β,21-triol. Representative diacylates are the dipropionate, dibutyrate, divalerate, dihexanoate, dibenzoate, dioctanoate, diphenylacetate, and the like.

Similarly, treating 3,5,17(20)-pregnatriene-3,11β,21-triol 3,11,21-triacetate with sodium borohydride and then lithium aluminum hydride in the same manner given above is productive of 5,17(20)-pregnadiene-3β,11β,21-triol. In the same manner treating other triacylates of 3,5,17(20)-pregnatriene-3β,11β,21-triol wherein the acyl group is of an organic carboxylic acid, preferably of a hydrocarbon carboxylic acid containing from one to twelve carbon atoms inclusive, with sodium borohydride and then lithium aluminum hydride is productive of 5,17(20) - pregnadiene-3β,11β,21 - triol. Representative triacylates are the tripropionate, tributyrate, trivalerate, trihexanoate, tribenzoate, trioctanoate, tridiphenylacetate, and the like.

EXAMPLE 6

5,17(20)-pregnadiene-3β,11β,21-triol 3,21-diacetate

A reaction mixture consisting of 6.4 grams of 5,17(20)-pregnadiene-3β,11β,21-triol (having a melting point of 184 to 204 degrees centigrade), ten milliliters of acetic anhydride and twenty milliliters of pyridine was allowed to stand for seventeen hours, then was poured into 250 milliliters of water containing twenty milliliters of concentrated hydrochloric acid. The resulting mixture was extracted with methylene chloride. The methylene chloride extract was washed with water, then with saturated aqueous sodium bicarbonate, and dried over sodium sulfate, then was evaporated in vacuo to dryness giving 8.21 grams of partially crystalline 5,17(20)-pregnadiene-3β,11β,21-triol 3,21-diacetate.

EXAMPLE 7

5,17(20)-pregnadiene-3β,11β,21 - triol 3,21 - dipropionate

In the same manner given in Example 6, treating 5,17-(20)-pregnadiene-3β,11β,21-triol with propionic anhydride in pyridine solution is productive of 5,17(20)-pregnadiene-3β,11β,21-triol 3,21-dipropionate.

EXAMPLE 8

5,17(20)-pregnadiene-3β,11β,21-triol 3,21-dibutyrate

In the same manner given in Example 6, treating 5,17(20)-pregnadiene-3β,11β,21-triol with butyric anhydride in pyridine solution is productive of 5,17(20)-pregnadiene-3β,11β,21-triol 3,21-dibutyrate.

EXAMPLE 9

5,17(20)-pregnadiene-3β,11β,21-triol 3,21-dibenzoate

In the same manner given in Example 6, treating 5,17-(20)-pregnadiene-3β,11β,21-triol with benzoyl chloride in pyridine solution yielded 5,17(20)-pregnadiene-3β,11β,21-triol 3,21-dibenzoate.

In the same manner as given in Examples 6 through 9, treating 5,17(20)-pregnadiene-3β,11β,21-triol with acid anhydrides or acid chlorides or bromides of organic carboxylic acids, preferably hydrocarbon carboxylic acids, is productive of the corresponding 5,17(20)-pregnadiene-3β,11β,21-triol 3,21-diacylates. In this manner the 3,21-diformate, dipropionate, dibutyrate, di-isobutyrate, divalerate, diisovalerate, di-trimethylacetate, di-2-methylbutyrate, di-3-ethylbutyrate, di-hexanoate, di-diethylacetate, di-triethylacetate, diheptanoate, dioctanoate, di-α-ethylisovalerate, disuccinate, cyclic acid ester, for example the 3,21-di-cyclopropylideneacetate, di - cyclopentylformate, di-cyclopentylacetate, di-β-cyclohexylpropionate, di-cyclohexylformate, di-cyclohexylacetate, aryl or alkaryl acid esters, for example the 3,21-dibenzoate, di-2,3-, or 4-methylbenzoate, di-2,3-, 2,4-, 2,5-, 2,6-, 3,4-, and 3,5-dimethylbenzoate, di-ethylbenzoate, di-2,4,6-trimethylbenzoate, di-2,4,6-triethylbenzoate, di-α-naphthoate, di-3-methyl-α-naphthoate, aralkyl acid esters, for example the 3,21 - diphenylacetate, diphenylpropionate, di-diphenylacetate, di-triphenylacetate, unsaturated acid esters, for example the 3,21-diacrylate, dimaleate, di-vinylacetate, dipropiolate, diundecolate, and the like 3,21-diesters of 5,17(20)-pregnadiene-3β,11β-21-triol are obtained.

EXAMPLE 10

3β,11β,17α,21 - tetrahydroxy - 5 - pregnen-20-one 3,21-diacetate

A solution of 8.21 grams of crude 5,17(20)-pregnadiene-3β,11β,21-triol 3,21-diacetate and four milliliters of pyridine in 370 milliliters of tertiary butyl alcohol was stirred at room temperature and 27 milliliters of a tertiary butyl alcohol solution of N-methylmorpholine oxide peroxide (one milliliter of solution required 38.8 milliliters of 0.1 normal sodium thiosulfate for titration) was added, then a solution of fourteen milligrams of osmium tetroxide in seven milliliters of tertiary butyl alcohol was added. Stirring was continued, and additional seven-milliliter portions of a tertiary butyl alcohol solution containing fourteen milligrams of osmium tetroxide in seven milliliters of tertiary butyl alcohol were introduced into the reaction mixture after eighteen hours, 24 hours, and forty hours. At the end of 112 hours no excess oxidizing agent was present in the reaction mixture. At this time eight grams of filter aid and 160 milliliters of 0.5 percent aqueous sodium hydrosulfite were added, and the mixture was stirred for one hour then filtered. The filtrate was concentrated in vacuo and the residue was partitioned between methylene chloride and water. The methylene chloride solution was dried over anhydrous sodium sulfate and chromatographed over 400 grams of Florisil synthetic magnesium silicate. Elution of the column with fourteen percent acetone in Skellysolve B hexanes gave 3.68 grams of crystals showing a strong Tollens test. The thus obtained product was recrystallized from a minimum volume of methanol to yield two grams of $3\beta,11\beta,17\alpha,21$-tetrahydroxy - 5 - pregnen-20-one 3,21-diacetate having a melting point of 193 to 203 degrees centigrade and the following analysis:

Analysis.—Calculated for $C_{25}H_{36}O_7$: C, 66.94; H, 8.09. Found: C, 66.66; H, 7.74.

In the same manner as given above, treating other 3,21-diacylates, wherein the acyl group is that of an organic carboxylic acid, preferably of a hydrocarbon carboxylic acid containing from one to twelve carbon atoms, inclusive, of 5,17(20)-pregnadiene-$3\beta,11\beta,21$-triol with N-methylmorpholine oxide peroxide in the presence of osmium tetroxide is productive of the corresponding $3\beta,11\beta,17\alpha,21$-tetrahydroxy-5-pregnen-20-one 3,21-diacylates, for example the 3,21-diformate, dipropionate, dibutyrate, di-isobutyrate, divalerate, di-isovalerate, di-trimethylacetate, di-2-methylbutyrate, di-3-ethylbutyrate, dihexanoate, di-diethylacetate, ditriethylacetate, diheptanoate, dioctanoate, di-$\alpha$-ethylisovalerate, disuccinate, cyclic acid esters, for example the 3,21-dicyclopropylidene-acetate, di-cyclopentylformate, di-cyclopentylacetate, di-$\beta$-cyclohexylpropionate, di-cyclohexylformate, di-cyclohexylacetate, aryl or alkaryl acid esters, for example the 3,21-dibenzoate, di-2,3-, or 4-methylbenzoate, di-2,3-, 2,4-, 2,5-, 2,6-, 3,4-, and 3,5-dimethylbenzoate, di-ethylbenzoate, di-2,4,6-trimethylbenzoate, di-2,4,6-triethylbenzoate, di-$\alpha$-naphthoate, di-3-methyl-$\alpha$-naphthoate, aralkyl acid esters, for example the 3,21-di-phenylacetate, diphenylpropionate, di-diphenylacetate, di-triphenylacetate, unsaturated acid esters, for example the 3,21-diacrylate, dimaleate, di-vinylacetate, dipropiolate, diundecolate, and the like.

EXAMPLE 11

$3\beta,11\beta,17\alpha,21$-tetrahydroxy-5-pregnen-20-one

A solution of 1.3 grams of $3\beta,11\beta,17\alpha,21$-tetrahydroxy-4-pregnen-20-one 3,21-diacetate in 100 milliliters of methanol was stirred at room temperature under nitrogen and 7.4 milliliters of 0.5 percent methanolic sodium hydroxide was added. The reaction mixture was stirred one hour, then the mixture was neutralized by the dropwise addition of acetic acid and concentrated in vacuo giving a residue which was triturated with boiling ethyl acetate. The ethyl acetate solution was concentrated in vacuo and the product was chromatographed over 125 grams of Florisil synthetic magnesium silicate. Elution of the column with forty percent acetone in Skellysolve B hexanes removed 0.67 gram of a crystalline product which was recrystallized from 25 milliliters of ethyl acetate to give 0.39 gram of $3\beta,11\beta,17\alpha,21$-tetrahydroxy-5-pregnen-20-one having a melting point of 231 to 236 degrees centigrade with apparent decomposition (bubbling) and the following analysis:

Analysis.—Calculated for $C_{21}H_{32}O_5$: C, 69.20; H, 8.85. Found: C, 69.57; H, 8.56.

In the same manner given in Example 11, treating $3\beta,11\beta,17\alpha,21$-tetrahydroxy-5-pregnen-20-one 3,21-dipropionate with methanolic sodium hydroxide is productive of $3\beta,11\beta,17\alpha,21$-tetrahydroxy-5-pregnen-20-one. In the same manner as given above, treating other $3\beta,11\beta,17\alpha$, 21-tetrahydroxy-5-pregnen-20-one 3,21-diacylates wherein the acyl group is of an organic carboxylic acid, preferably of a hydrocarbon carboxylic acid containing from one to twelve carbon atoms, inclusive, with methanolic sodium hydroxide is productive of $3\beta,11\beta,17\alpha,21$-tetrahydroxy-5-pregnen-20-one.

It is to be understood that the invention is not to be limited to the exact details of operation or exact compounds shown and described as obvious modifications and equivalents will be apparent to one skilled in the art. The invention is therefore to be limited only by the scope of the appended claims.

We claim:
1. $3\beta,11\beta,17\alpha,21$-tetrahydroxy-5-pregnen-20-one and the 3,2-diacylates thereof, wherein the acyl radical is that of a hydrocarbon carboxylic acid containing from one to twelve carbon atoms, inclusive.
2. $3\beta,11\beta,17\alpha,21$-tetrahydroxy-5-pregnen-20-one.
3. $3\beta,11\beta,17\alpha,21$-tetrahydroxy-5-pregnen-20-one 3,21-diacetate.
4. 5,17(20)-pregnadiene-$3\beta,11\beta,21$-triol and the 3,21-diacylates thereof, wherein the acyl radical is that of a hydrocarbon carboxylic acid containing from one to twelve carbon atoms, inclusive.
5. 5,17(20)-pregnadiene-$3\beta,11\beta,21$-triol.
6. 5,17(20)-pregnadiene-$3\beta,11\beta,20$-triol 3,21-diacetate.
7. 11-oxygenated-3,5,17(20)-pregnatriene-$3\beta,21$-diol 3,21-diacylate wherein the 11-oxygen substituent is selected from the group consisting of keto and $\beta$-acyloxy, and wherein the acyl radical is that of a hydrocarbon carboxylic acid containing from one to twelve carbon atoms, inclusive.
8. $3\beta,21$ - dihydroxy - 3,5,17(20) - pregnatrien - 11-one 3,21-diacetate.
9. 3,5,17(20) - pregnatriene - $3\beta,11\beta,21$ - trihydroxy 3,11,21-triacetate.
10. A process for the production of $3\beta,11\beta,17\alpha,21$-tetrahydroxy-5-pregnen-20-one and the 3,21-diacylates thereof wherein the acyl group is that of a hydrocarbon carboxylic acid containing from one to twelve carbon atoms, inclusive, which comprises: (1) treating a compound selected from the group consisting of an 11-oxygenated 21-hydroxy-4,17(20)-pregnadien-3-one and a 21-acylate thereof, with an acylating agent to obtain an 11-oxygenated 3,5,17(20)-pregnatriene-$3\beta,21$-diol 3,21-diacylate wherein the 11-oxygen substituent is keto or $\beta$-acyloxy and the acyl group is as defined above, (2) treating the thus obtained enol acetate successively with an alkali-metal borohydride and then with lithium aluminum hydride to obtain 5,7(20)-pregnadiene-$3\beta,11\beta,21$-triol, (3) esterifying the thus obtained triol with an acylating agent to produce 5,17(20)-pregnadiene $3\beta,11\beta,21$-triol, 3,21-diacylate, (4) treating the thus obtained 5,17(20)-pregnadiene $3\beta,11\beta,21$-triol 3,21-diacylate with osmium tetroxide and an oxidizing agent to obtain $3\beta,11\beta,17\alpha,21$-tetrahydroxy-5-pregnen-20-one 3,21-diacylate, and (5) hydrolyzing the thus obtained $3\beta,11\beta,17\alpha,21$-tetrahydroxy-5-pregnen-20-one 3,21-diacylate with a base.
11. A process for the production of $3\beta,11\beta,17\alpha,21$-tetrahydroxy-5-pregnen-20-one which comprises: (1) treating 21-hydroxy-4,17(20)-pregnadiene-3,11,dione 21-acetate with ispropenyl acetate to produce $3\beta,21$-dihydroxy-3,5,17(20)-pregnatrien-11-one 3,21-diacetate, (2) treating the thus obtained enol acetate successively with sodium borohydride and then with lithium aluminum hydride to produce 5,17(20)-pregnadiene-3β,11β,21-triol, (3) treating the triol with acetic anhydride to obtain 5,17(20)-pregnadiene-3β,11β,21-triol 3,21-diacetate, (4) treating the thus obtained 5,17(20)-pregnadiene-3β,11β, 21-triol 3,21-diacetate with osmium tetroxide and N-methyl-morpholine oxide-peroxide to obtain 3β,11β,17α, 21-tetrahydroxy-5-pregnen-20-one 3,21-diacetate and (5) treating the thus obtained 3β,11β,17α,21-tetrahydroxy-5-pregnene-20-one 3,21-diacetate with an alkali metal hydroxide.

12. A process for the production of 5,17(20)-pregnadiene-3β,11β,21-triol which comprises: treating a compound selected from the group consisting of an 11-oxygenated-21-hydroxy-4,17(20)-pregnadien-3-one and a 21-acylate thereof, wherein the 11-oxygen substituent is keto or β-acyloxy and each acyl group is that of a hydrocarbon carboxylic acid containing from one to twelve carbon atoms, inclusive, with an acylating agent to obtain 11-oxygenated 3,5,17(20)-pregnatriene-3β,21-diol 3,21-diacylate; and treating the thus obtained enol acylate successively with an alkali metal borohydride and then with lithium aluminum hydride.

13. A process for the production of 5,17(20)-pregnadiene-3β,11β,21-triol which comprises: treating 21-hydroxy-4,17(20)-pregnadiene-3,11-dione 21-acetate with isopropenyl acetate to produce 3β,21-dihydroxy-3,5,17(20)-pregnatrien-11-one 3,21-diacetate, and treating the thus obtained enol acetate successively with sodium borohydride and then with lithium aluminum hydride.

14. A process for the production of 3β,11β,17α,21-tetrahydroxy-5-pregnen-20-one which comprises: treating 5,17(20)-pregnadiene-3β,11β,21-triol with an acylating agent to obtain 5,17(20)-pregnadiene-3β,11β,21-triol, 3,21-diacylate, wherein the acyl group is that of a hydrocarbon carboxylic acid containing from one to twelve carbon atoms, inclusive; treating the thus obtained 5,17 (20)-pregnadiene-3β,11β,21-triol 3,21-diacylate with osmium tetroxide and an oxidizing agent, a compound selected from the group consisting of peracids and peroxides, to obtain 3β,11β,17α,21-tetrahydroxy-5-pregnen-20-one 3,21-diacylate, and treating the thus obtained 3β, 11β,17α,21-tetrahydroxy-5-pregnen-20-one 3,21-diacylate with a base.

15. A process for the production of 3β,11β,17α,21-tetrahydroxy-5-pregnen-20-one which comprises: treating 5,17(20)-pregnadiene-3β,11β,21-triol with acetic anhydride to obtain 5,17(20)-pregnadiene-3β,11β,21-triol 3, 21-diacetate; treating the thus obtained 5,17(20)-pregnadiene-3β,11β,21-triol 3,21-diacetate with osmium tetroxide and N-methylmorpholine oxide-peroxide to obtain 3β,11β,17α,21-tetrahydroxy-5-pregnen-20-one 3, 21-diacetate, and treating the thus obtained 3β,11β,17α, 21-tetrahydroxy-5-pregnen-20-one 3,21-diacetate with an alkali metal hydroxide.

References Cited in the file of this patent

UNITED STATES PATENTS

| | | |
|---|---|---|
| 2,409,798 | Reichstein | Oct. 22, 1946 |
| 2,752,366 | Hogg et al. | June 26, 1956 |

UNITED STATES PATENT OFFICE
CERTIFICATE OF CORRECTION

Patent No. 2,899,448                      August 11, 1959

Philip F. Beal et al.

It is hereby certified that error appears in the printed specification of the above numbered patent requiring correction and that the said Letter Patent should read as corrected below.

Column 10, line 25, for "3,2-diacylates" read -- 3,21-diacylates --; line 60, for "5,7(20)-pregnadiene-" read -- 5,17(20)-pregnadiene- --.

Signed and sealed this 23rd day of February 1960.

(SEAL)
Attest:

KARL H. AXLINE
Attesting Officer

ROBERT C. WATSON
Commissioner of Patents